United States Patent
Wang

(10) Patent No.: US 7,096,019 B2
(45) Date of Patent: Aug. 22, 2006

(54) APPARATUS, AND ASSOCIATED METHOD, FOR ALLOCATING CHANNELS IN A RADIO COMMUNICATION SYSTEM RESPONSIVE TO MOBILE STATION MOVEMENT

(75) Inventor: Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 10/160,213

(22) Filed: May 31, 2002

(65) Prior Publication Data

US 2004/0203857 A1    Oct. 14, 2004

(51) Int. Cl.
    *H04Q 7/20* (2006.01)
(52) U.S. Cl. .................. 455/437; 455/440; 455/441; 455/444; 455/456; 455/524; 455/525; 455/447; 455/62; 455/63; 455/442
(58) Field of Classification Search ......... 455/441, 455/552, 434, 444, 437, 436, 69, 226.1, 136, 455/440, 456, 524, 525, 447, 62, 63, 442; 370/337, 468
    See application file for complete search history.

(56) References Cited

U.S. PATENT DOCUMENTS

| | | | | |
|---|---|---|---|---|
| 5,448,751 A | * | 9/1995 | Takenaka et al. | 455/450 |
| 5,930,721 A | * | 7/1999 | Fried et al. | 455/466 |
| 5,943,606 A | * | 8/1999 | Kremm et al. | 455/12.1 |
| 6,195,342 B1 | * | 2/2001 | Rohani | 370/331 |
| 6,253,084 B1 | * | 6/2001 | Monot | 455/441 |
| 6,292,736 B1 | * | 9/2001 | Aruga et al. | 701/95 |
| 6,351,642 B1 | * | 2/2002 | Corbett et al. | 455/442 |
| 6,438,376 B1 | * | 8/2002 | Elliott et al. | 455/437 |
| 6,480,716 B1 | * | 11/2002 | Salonaho | 455/441 |
| 6,862,457 B1 | * | 3/2005 | Sarkar et al. | 455/522 |
| 2001/0033600 A1 | * | 10/2001 | Yang et al. | 375/130 |
| 2001/0041575 A1 | * | 11/2001 | Amirijoo et al. | 455/456 |
| 2002/0168988 A1 | * | 11/2002 | Younis | 455/456 |
| 2003/0054829 A1 | * | 3/2003 | Moisio | 455/452 |
| 2003/0069043 A1 | * | 4/2003 | Chhaochharia et al. | 455/561 |
| 2003/0114162 A1 | * | 6/2003 | Chheda et al. | 455/447 |
| 2003/0148774 A1 | * | 8/2003 | Naghian et al. | 455/456 |
| 2003/0222819 A1 | * | 12/2003 | Karr et al. | 342/457 |

* cited by examiner

*Primary Examiner*—Joseph Feild
*Assistant Examiner*—Julio Perez
(74) *Attorney, Agent, or Firm*—Foley & Lardner, LLP

(57) ABSTRACT

Apparatus, and an associated method, for allocating channels within a cell of a cellular communication system. Allocations are made by an allocator based upon determinations made by a determiner of the likelihood of movement of the mobile station. Determinations made by the determiner are made responsive to analyses of indicia of prior movement behavior of the mobile station stored at a home location register associated with the mobile station. Channel reuse is effectuated if the mobile station is determined to be stationary or moving at a speed less than a selected threshold. Otherwise, uniquely-assigned channels are allocated to the mobile station.

27 Claims, 5 Drawing Sheets

| Zone For Code Reuse | A | B | C | D | E | F | G | H | I | J |
|---|---|---|---|---|---|---|---|---|---|---|
| A | 0 | 0 | 0 | 0 | 1 | 1 | 1 | 1 | 1 | 1 |
| B | 0 | 0 | 0 | 0 | 0 | 0 | 1 | 1 | 1 | 1 |
| C | 0 | 0 | 0 | 0 | 0 | 0 | 1 | 1 | 1 | 1 |
| D | 0 | 0 | 0 | 0 | 0 | 0 | 1 | 1 | 1 | 1 |
| E | 1 | 0 | 0 | 0 | 0 | 0 | 0 | 1 | 1 | 1 |
| F | 1 | 0 | 0 | 0 | 0 | 0 | 0 | 0 | 1 | 1 |
| G | 1 | 1 | 1 | 1 | 0 | 0 | 0 | 0 | 0 | 1 |
| H | 1 | 1 | 1 | 1 | 1 | 1 | 0 | 0 | 0 | 0 |
| I | 1 | 1 | 1 | 1 | 1 | 1 | 0 | 0 | 0 | 0 |
| J | 1 | 1 | 1 | 1 | 1 | 1 | 1 | 0 | 0 | 0 |

FIG. 4

APPARATUS, AND ASSOCIATED METHOD, FOR ALLOCATING CHANNELS IN A RADIO COMMUNICATION SYSTEM RESPONSIVE TO MOBILE STATION MOVEMENT

The present invention relates generally to a manner by which to reuse channels within a cell of a cellular communication system. More particularly, the present invention relates to apparatus, and an associated method, by which selectably to reuse channels at selected zones within a cell, responsive to statistical indication of movement of a mobile station.

When a mobile station to which a channel is to be allocated appears unlikely to be moving at a speed beyond a selected threshold, the channel allocated thereto is selected pursuant to a channel reuse scheme. Otherwise, a uniquely-assigned channel is allocated for communications with the mobile station. Increased radio channel capacity is permitted as channels are selectably reused within a cell. Channels are reused only upon determination that the reuse shall not interfere with ongoing communications elsewhere in the cell. The increased capacity is provided, therefore, without increase in channel interference.

BACKGROUND OF THE INVENTION

Operation of a communication system provides for the communication of data between two or more spaced-apart locations. Communication stations positioned at the separate locations are connected by way of a communication channel upon which the data is communicated therebetween. A communication system, at which the data is sourced, forms a sending station that operates to send the data upon the communication channel. And, a communication station, positioned at the second location forms a receiving station operable to detect, and operate upon, the data communicated upon the communication channel by the sending station.

A radio communication system is a type of communication system in which the communication channel interconnecting the communication stations is formed upon a radio link. Because a radio link is utilized upon which to define the communication channels used to communicate data between the communication stations, a wireline connection is not required to be formed between the communication stations.

Communications by way of a radio communication system are therefore advantageous when the use of a wireline connection would be inconvenient or impractical. Radio communication systems are also generally more economical to install as the infrastructure costs associated with a radio communication system are generally less than the corresponding infrastructure costs of a wireline communication system.

A cellular communication system is exemplary of a radio communication system. A cellular communication system provides for the effectuation of telephonic communications by way of radio channels. Cellular communication systems have been installed throughout significant parts of the populated portions of the world. Various cellular communication standards have been promulgated, setting forth the operational parameters of different types of cellular communication systems.

Typically, a cellular communication system includes a fixed network infrastructure that is installed throughout the geographical area that is to be encompassed by the communication system. The fixed network infrastructure includes fixed-site, base transceiver stations. The fixed-site base transceiver stations are positioned at space-apart locations, and each base transceiver station defines an area, referred to as a cell, from which the cellular communication system derives its name. And, the fixed network infrastructure is coupled to a core network, such as a packet data backbone, or a public-switched telephonic network. Communication devices, such as computer servers, telephonic stations, etc., are connected to, or form portions of, the core network.

Mobile stations are utilized through which to communicate with the base transceiver stations. Mobile stations are formed of radio transceivers, usually of dimensions that permit their carriage by users. Use of the cellular communication system is permitted, typically, pursuant to a service subscription. And, users referred to as subscribers, communicate by way of the cellular communication system through utilization of the mobile stations.

Cellular communication systems are used extensively to communicate telephonically. Communication of voice, and other, data is popularly effectuated by way of cellular communication systems. Usage levels of many cellular communication systems have, at times, approached maximum system capacity. System capacity is sometimes constrained by the bandwidth allocated to the communication system. When communication capacity is met, additional communications in the communication system are not permitted until ongoing communication sessions are terminated. For CDMA system, additional communications may permitted. However, the received signal for all the mobile calls will have a low voice/data qualities. As new types of communication services are being made available for effectuation by way of cellular communication systems, capacity problems are likely to continue.

Efforts, therefore, are made to find manners by which to increase the communication capacity of cellular communication systems. Many manners by which to increase the communication capacity of the communication system also cause an increase in co-channel interference. Cell sectorization is exemplary of a manner sometimes used by which to attempt to increase communication capacity in a cellular system. Through use of a cell sectorization technique, system capacity can be increased without a corresponding increase in a co-channel interference ratio. But, use of a cell sectorization technique decreases trunking efficiency and increases handoff loading due to increased numbers of handoffs.

Cell-splitting techniques are also sometimes used to increase communication capacity in a cellular communication system. Channel capacity is increased by reducing the size of the cell. But, cell-splitting techniques also increase the handoff loading, thereby burdening the system link/switch capacity at the MSC (mobile switching center) thereof.

Because of the increased loading, as well as other difficulties, use of cell sectorization or cell splitting techniques by which to increase system capacity is somewhat limited.

Transmitter beam forming techniques are also sometimes used to increase the co-channel interference ratio (CCIR). But, beam forming typically requires the use of sophisticated, phase-array antennas and also the use of direction-of-arrival (DOA) algorithms. And, interference cancellation and multi-user detection techniques are also sometimes utilized. But, these techniques require complex computations to be carried out to perform the functions of such techniques.

Existing techniques by which to increase the communication capacity of a cellular communication system, therefore, suffer from various disadvantages due to, e.g., variously increased handoff loading or increased computational complexity, an improved manner by which to increase the capacity of a cellular communication system would therefore be advantageous.

It is in light of this background information related to communications in a cellular, or other, radio communication system that the significant improvements of the present invention have evolved.

SUMMARY OF THE INVENTION

The present invention, accordingly, advantageously provides apparatus, and an associated method, by which to reuse channels within a cell of a cellular communication system.

Through operation of an embodiment of the present invention, a manner is provided by which selectively to reuse channels at selected zones within a cell responsive to statistical indications of movement of a mobile statement.

If a mobile station to which a channel is to be allocated appears unlikely to be moving at a speed greater than a selected threshold, the channel that is allocated to the mobile station is selected pursuant to a code reuse scheme. If, instead, the mobile station is determined to be moving at a speed greater than the selected threshold, a uniquely-assigned channel is instead allocated for communication with the mobile station.

Operation of an embodiment of the present invention permits the radio channel capacity in the cell to be increased as channels are selectably reused within the cell. Channels are reused only upon determination that the reuse shall not increase the co-channel interference ratio, i.e., not interfere with ongoing communications elsewhere in the cell. The increased capacity is provided, therefore, without increase in channel interference. And, increase in the capacity is provided also without increase in handoff loading within the cell as the number of handoffs required to be performed within the cell remains unchanged.

Therefore, through operation of an embodiment of the present invention, the number of radio channels available upon which to be allocated for effectuation of a communication session within a cell is increased without increasing the channel interference ratio. And, no handoff signaling increase, at the base station controller or mobile switching center, is required in the cell, i.e., reducing link/switch signaling burden or increase link/switch capacity. Therefore, the overall capacity, i.e., the radio capacity, the link capacity, and the switch capacity, are significantly improved. Thereby, the capacity of the communication system is permitted to be increased such as in amounts great enough to permit the sending of high-speed data by way of multiple radio channels as well as to permit early-reservation of channels for communications with mobile stations for which the cell forms a target cell.

In one aspect of the present invention, a cell is divided into a plurality of zones. Each zone is defined by a zone antenna. Separate zone antennas are positioned at spaced-locations within the cell. And, each zone antenna is coupled to a base transceiver station that defines the cell. Mobile stations generate reverse-link signals that are detected by individual ones of the zone antennas. And, forward-link signals are generated by the zone antennas, for communication to the mobile stations. Macro diversity combining is used on the reverse-link communications. And, forward-link signals, such as pilot signals generated in a CDMA system, are transmitted by each of the zone antennas, in synchronization, due to the common coupling with the base transceiver station. Because of the positioning of the zone antennas at the spaced locations throughout the cell, reverse- and forward-link signals can be communicated at reduced power levels, generally, relative to the power levels required to communicate corresponding signals in a system in which the signals must be communicated directly with the base transceiver station.

In another aspect of the present invention, the moving behavior of a mobile station is determined, at least on a statistical basis. If the mobile station is moving, the mobile station shall successively communicate with successive zone antennas. And, if the mobile station is near stationary, the mobile station communicates successively with a single zone antenna. When the mobile station is not moving, or moving at a speed less than a selected threshold, the channel allocated to the mobile station for communication thereon is selected pursuant to a channel reuse scheme. If, conversely, the mobile station is determined to be moving at a speed in excess of a selected threshold, the channel allocated to the mobile station forms a uniquely-assigned channel within the cell.

In another aspect of the present invention, indicia associated with the moving behavior of the mobile station is stored at a home location register (HLR) associated with the mobile station. The indicia define a characteristic profile of the mobile station. Indicia associated with the mobile station is generated, for instance, during registration procedures and during selected update intervals thereafter. When a subsequent request for allocation of a channel to the mobile station is generated, such as when a mobile-originated call is initiated or when a mobile-terminated call is originated, the moving behavior of the mobile station is accessed and analyzed to determine whether to allocate a channel to the mobile station pursuant to a reuse scheme or to allocate a uniquely-assigned channel to the mobile station.

In another aspect of the present invention, determinations of in what manner to allocate a channel to the mobile station is made on a probabilistic basis. That is to say, a probability of subsequent movement of the mobile station is determined, based upon historical indicia stored at the location register of past movement of the mobile station.

In one implementation, a mobile-location assisted code reuse scheme within a cell defined in a CDMA (code-division multiple-access) cellular communication system is provided. Channels in the system are defined by codes by which data is encoded prior to its communication between communication stations of the system. And, the cell is divided into a plurality of zones, each zone defined by a zone antenna that is coupled to a base transceiver station. Moving behavior associated with the mobile station is generated and indicia thereof is stored at a home location register associated with the mobile station. When a channel is requested to be allocated to the mobile station, determination is made, on a statistical basis, whether the mobile station is likely to be moving at a speed in excess of a selected threshold. If so, the mobile station is assigned a unique code, unique throughout the cell, by which to encode data pursuant to a communication session. If, conversely, a determination is made, on a statistical basis, that the mobile station shall be unlikely to be traveling at a speed in excess of the selected threshold, the code assigned to the mobile station is selected pursuant to a code reuse scheme within the cell.

Thereby, channel capacity within the cell is increased as channels are selectably reused within the cell. If the mobile station is determined not to be moving, channel reuse is permitted. But, if a mobile station is determined to be likely to be moving beyond a selected speed, the channel allocated to the mobile station is uniquely-assigned, thereby better to ensure that co-channel interference does not occur.

In these and other aspects, therefore, apparatus, and an associated method, is provided for a radio communication system. The radio communication system has a mobile station selectably moveable throughout an area defining a cell. The cell is divided into a first zone and at least a second zone. A channel is selectably assigned for communications with the mobile station. A position and movement determiner is coupled to receive indicia associated with positioning and movement of the mobile station. The position and movement determiner determines a position of the mobile station and a statistical indication of a speed, if any, at which the mobile station is moving. A channel allocator is coupled to the position and movement determiner. The channel allocator selectably assigns the channel for the communications with the mobile station. Channel assignment made by the channel allocator are responsive, at least in part, to the position and speed of the mobile station.

A more complete appreciation of the present invention and the scope thereof can be obtained from the accompanying drawings that are briefly summarized below, the following descriptions of the presently-preferred embodiments of the invention, and the appended claims.

BRIEF DESCRIPTION OF THE DRAWINGS

FIG. 4 illustrates an exemplary table generated during operation of an embodiment of the present invention showing an exemplary channel reuse scheme.

DETAILED DESCRIPTION

Figure 1:
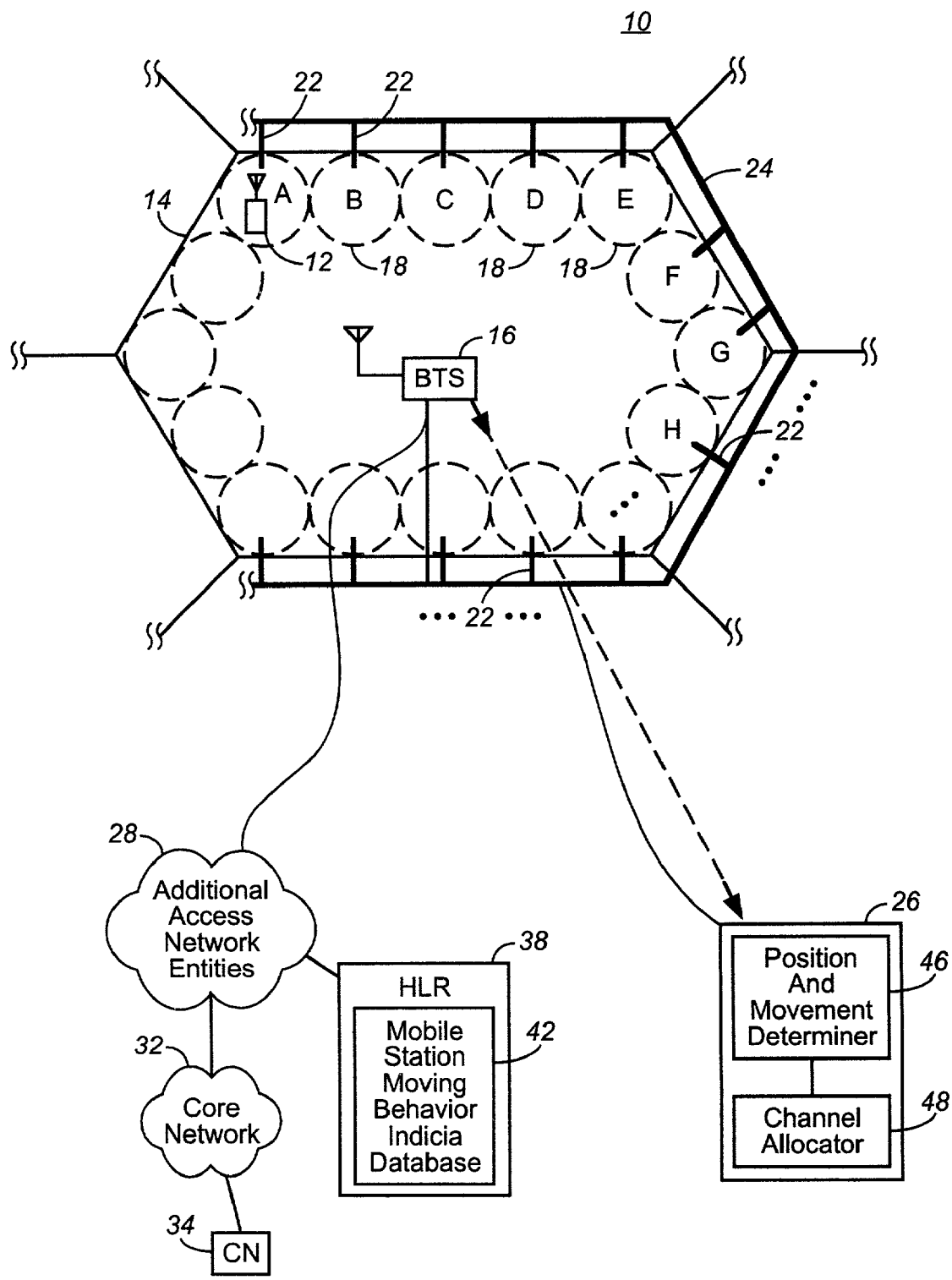
FIG. 1 illustrates a functional block diagram of a portion of a cellular communication system in which an embodiment of the present invention is implemented.

Referring first to FIG. 1, a portion of a radio communication system, shown generally at 10, provides for radio communications with a mobile station 12. In the exemplary implementation, the communication system 10 forms a cellular communication system operable, generally, pursuant to a CDMA (code-division, multiple-access) communication protocol, such as that defined in the CDMA 2000 or W-CDMA operational specification. The teachings of the present invention are, however, also implementable in other types of cellular and other radio, communication systems that define channels in manners other than by using unique codes. For instance, the teachings of the present invention are analogously also implementable in communication systems that utilize TDMA (time-division, multiple-access) communication schemes, such as the system defined in the GS7 (general system for mobile communications) operational specification. Accordingly, while the following description shall describe operation of an embodiment of the present invention with respect to its implementation in a CDMA communication system, the present invention is analogously also operable in other types of communication systems.

Here, a single cell 14 of the cellular communication system is represented. The cell 14 is defined by a base transceiver station (BTS) 16 that forms a portion of the network part of the communication system. The cell 14 is represented in a hexagonal configuration. In an actual implementation, the configuration, and size, of the cell might well differ with that shown. And, the system typically includes a large number of cells, each defined by a separate base transceiver station.

The cell 14 is divided into a plurality of smaller-sized zones 18. Each of the zones is defined by a zone antenna 22. The zone antennas are each connected, or otherwise coupled to, the base transceiver station. Data communicated between the mobile station and the base transceiver station is transduced by zone antennas positioned in proximity to the mobile station. Some of the zones are identified in the figure by alphabetical characters A, B, C, D, E, F, G, H, I and J. Such alphabetical characters also indicate code groupings, as shall be described herein below.

The zone antennas 22 are each coupled to the base transceiver station by way of a busline 24. The busline extends to functional elements of the base transceiver station. Here, the functional elements of the base transceiver station are represented at the block 26, here shown for purposes of illustration, separate from the base transceiver station but connected to the busline 24. The functions performed by the elements within the block 26 are performed by the base transceiver station 16 or elsewhere.

The base transceiver station 16 forms part of the access network of the communication system. Additional elements of the access network are represented at the additional access network entities block 28. Additional access network entities include, for instance, a radio network controller and a gateway device. The access network, in turn, is coupled to a core network 32. Correspondent entities, such as a correspondent node 34, are coupled to the core network. Communications are effectible between the correspondent node 34 and a mobile station, such as the mobile station 12, through the formation of a communication path through the core network, the access network 28 (and base transceiver station 16 thereof), and upon radio channels defined upon a radio link extending between an appropriate zone antenna 22 and the mobile station.

As the mobile station is permitted mobility, the mobile station might move throughout the cell, as well as move between cells of the communication system. Through operation of an embodiment of the present invention, a manner is provided by which selectively to allocate channels to the mobile station for communications therewith. If the mobile station is stationary, or moving at a speed less than a selected threshold, the channel allocated to the mobile station is selected pursuant to a channel reuse scheme. If, conversely, the mobile station is moving at a speed greater than the selected threshold, the channel allocated to the mobile station is not used elsewhere in the cell but, instead, is a uniquely-assigned channel. In the CDMA system of the exemplary implementation, the channels are defined by spreading codes, and the channel is allocated to the mobile station comprise such codes.

The mobile station 12 is associated with a home location register (HLR) 38. The location register 38 operates, in conventional manner, to maintain a database registry associated, amongst other things, with indications of the cell or region within which the mobile station is located. The home location register here also includes a mobile station moving behavior indicia database 42 that forms a portion of an embodiment of the present invention. During operation of the communication system, moving behavior indicia is provided to the home location register and stored at the database 42 thereof. The moving behavior indicia includes, for instance, position and time information associated with the mobile station. Such indicia is utilized by the apparatus 26 to obtain a statistical-based, probability of subsequent movement of the mobile station. Responsive to the determinations, the channel allocated to the mobile station is either a reused channel or a uniquely-assigned channel.

The apparatus 26 is here shown to include a position and movement determiner 46 and a channel allocator 48. The elements 46 and 48 are functional entities and are implemented in any desired manner. In the exemplary implementation, the elements are implemented by algorithms executable by a processing device.

When a channel allocation request is made to allocate a channel for communications with the mobile station, the position and movement determiner accesses data stored at the mobile station moving behavior and indicia database 42. The position and movement of the mobile station is determined therefrom. And, a determination is made whether the mobile station is moving at a speed greater than the selected threshold.

The channel allocator 48 operates responsive to determinations made by the determiner 46. The determiner and allocator, in the exemplary implementation, define a code reuse algorithm, here for a CDMA system, based upon knowledge of the moving behavior of the mobile station. During operation of the communication system at the cell 14, all of the zones 18 are co-located with a main base transceiver station 16 at the cell. Pilot signals generated during operation of the communication system are generated by the base transceiver station 16 and every zone shares the same radio equipment installed at the base transceiver station. All of the signals transmitted by way of the zone antennas that define respective ones of the zones and the base transceiver station are synchronized. When a mobile station is positioned within a particular zone 18, signals transmitted upon forward links to the mobile station are transduced only by the zone antenna defining the zone at which the mobile station is located. Conversely, when the mobile station generates signals communicated on the reverse-link channels, a macro diversity combining scheme is utilized to detect the reverse-link signals at, potentially, more than one of the zone antennas. That is to say, zone antennas at a zone cluster about the mobile station detect the reverse-link signals. Therefore, macro diversity combining is achievable within the zone cluster of the cell and another zone, positioned away from the zone cluster in the cell, while reusing the same orthogonal code, or other channel.

The code reuse incentive depends upon the probability of the mobile station being stationary and the co-channel interference between the code reuse zones. A zone area encompasses any of various designated areas, such as areas of less than one hundred meter diameters or areas of as great as, or even greater than, a couple of hundred meters.

The indicia stored at the database 42 is statistically updated and recorded, e.g., twenty-four hour paging-zone records, are maintained. When a mobile-originated or a mobile-terminated call is placed and a channel is to be allocated to the mobile station, the characteristic profile of the mobile station, identified by the moving behavior indicia, is accessed. Determination is made, statistically, whether the mobile station is stationary or is moving. If, for instance, a determination is made that the mobile station exhibits a ninety-nine percent probability that the mobile station has been stationary before, and subsequent to a time window centered at the time instance, the mobile station is determined to be statistically stationary. And, an orthogonal code, used elsewhere by another stationary mobile station, can be reused.

A channel formed upon a radio link with a mobile station is, typically, a Rayleigh fading channel and the long-term fading characteristics of the channel are assumed to be of a log-normal distribution, Pr, that the receive signal level shall exceed a certain threshold value γ in dBm is defined as follows:

$$Prob[P(d) > \gamma] = Q\left(\frac{\gamma - E[P(d)]}{\sigma}\right) \quad (3)$$

and $$E[P(d)] = P(d_0) + 10 \cdot n \cdot \log\left(\frac{d}{d_0}\right) \quad (4)$$

Wherein:
P(d) is the receive signal power in dBm;
Q is the probability-theory Q function;
σ is the standard deviation of the receive signal in dB;
E[P(d)] is the mean received power in dBm; $d_0$ is the reference distance; and n is the path loss exponent.

The ratio of probability channel interference measurement is based upon:

$$\text{The ratio of probability of } \frac{C}{I} = \frac{Prob[P(r) > \gamma]}{\sum_{i=1}^{m} Prob[P_i(d_i) > \gamma]} \quad (5)$$

Wherein:
C/I is a carrier to noise ratio;
P(r) is a desired transmit power;
$P_i(d_i)$ is the interference power with a power-control scheme applied;
r is the zone radius of the mobile station;
$d_i$ is the distance from the mobile station to the i-th code reuse antenna; and
m is the total number of code reuse zones in the cell.

When the ratio of probability of C/I is smaller than a certain interference threshold, the code reuse is applied to stationary mobile stations for which a channel allocation is requested. Thereby, viewer orthogonal codes, or radio channels otherwise-defined, are used in the cell when many mobile stations are stationary and co-channel interferences are low. Also, more available orthogonal codes can be assigned to mobile stations that request high speed data services and mobile stations that might be entering the cell from adjacent cells that might request early channel reservation to assure good quality of services.

Figure 2:
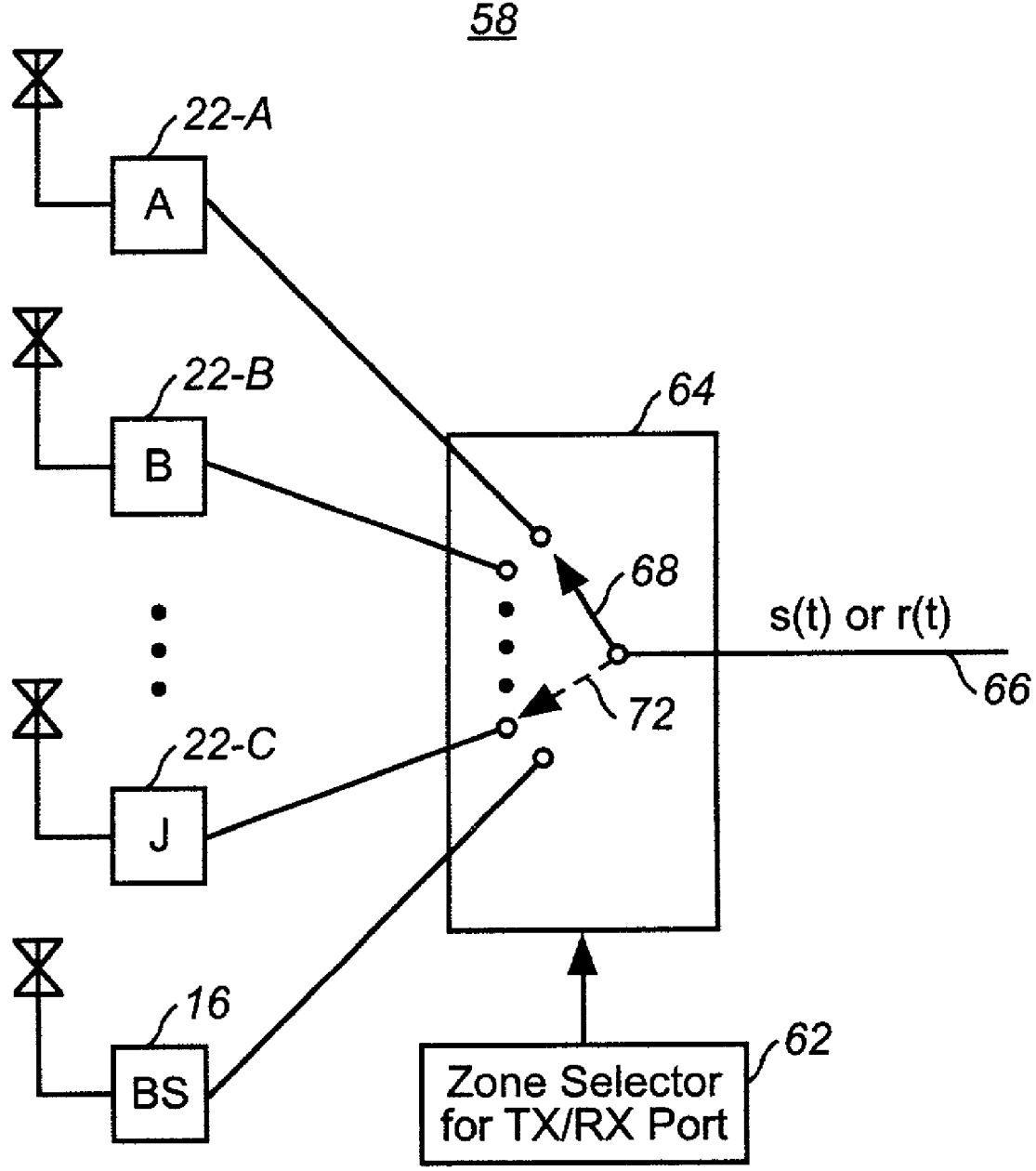
FIG. 2 illustrates a functional block diagram representative of a manner by which selectably to connect zone antennas forming a portion of the cellular communication system shown in FIG. 1 on the forward and reverse links to effectuate communications thereon.

FIG. 2 illustrates a representation, shown generally at 58, of an adaptive selection mechanism by which selected ones of the zone antennas 22 are selectively connected to receive reverse-link signals or to transmit forward-link signals. A zone selector function 62 located, for instance, at the base transceiver station 16, selects which zone antenna at which to transduce forward-link signals for communication on a forward-link channel to the mobile station. The zone selector also selects which zone antennas are to be utilized to transduce reverse-link signals transmitted by the mobile station to the network part of the communication system. As noted above, a single antenna transducer is utilized to transduce forward-link signals while a group of antenna transducers are utilized to detect reverse-link signals pursuant to a macro diversity scheme.

Selections made by the selector 62 are effectuated, here by a switch element 64, that is functionally represented in the Figure. Forward-link signals, s(t), generated on the line 66, are applied to the switch element. On the forward-link, the switch element forms a single-pole, multiple throw element having a pole 68 for connecting the line 66 to a selected one of the zone antennas or an antenna transducer of the base transceiver station. And, for the reverse link, the switch element forms a multiple-pole, multiple throw element, here utilizing both the pole 68 and at least one additional pole 72, to connect at least two of the zone antennas, or base transceiver station antenna, to the line 66, to cause the generation of a receive signal, r(t), thereon.

Figure 3:
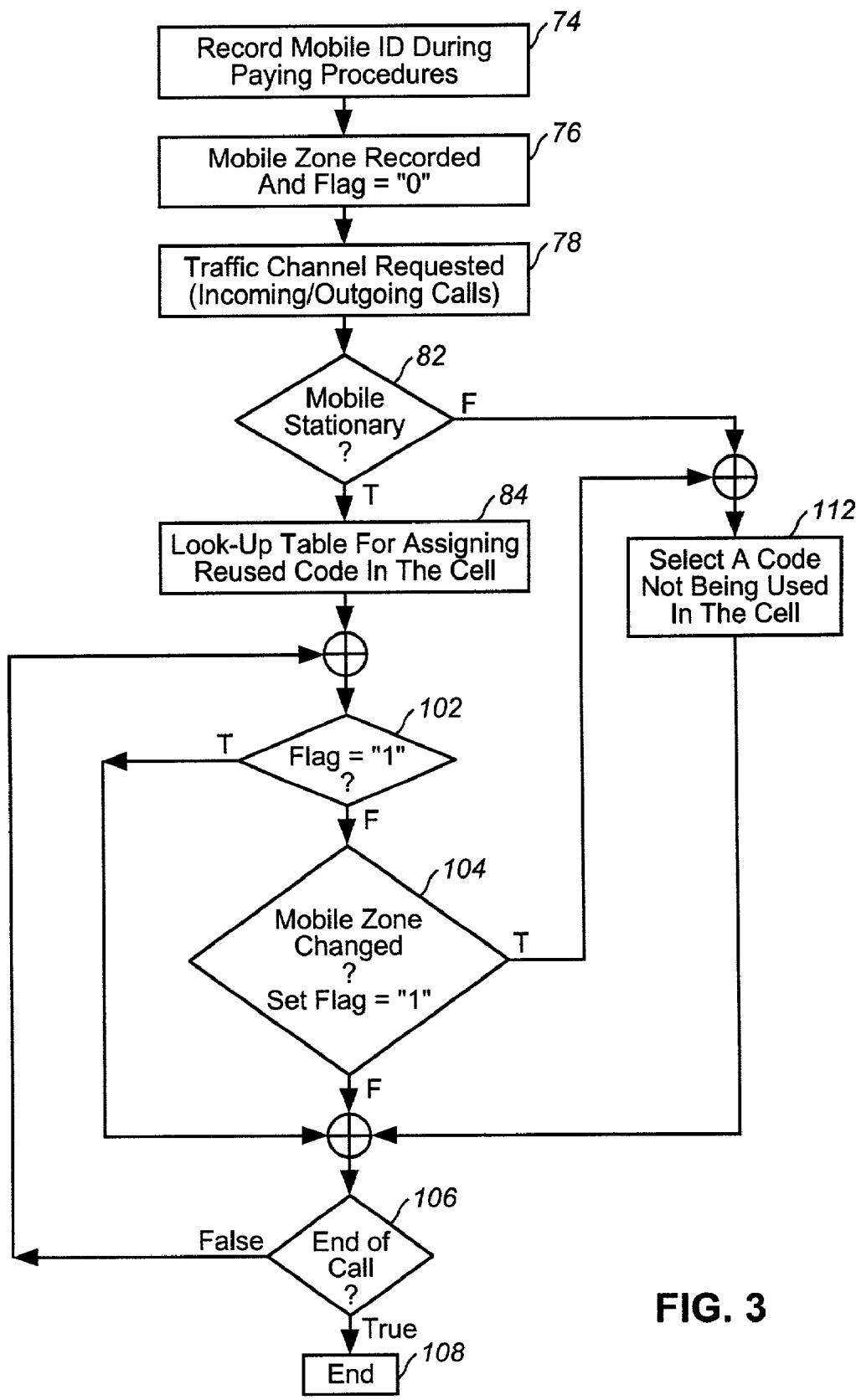
FIG. 3 illustrates a process diagram representing operation of an embodiment of the present invention.

FIG. 3 illustrates a method flow diagram, shown generally at 72, representative of operation of the apparatus 26 during operation of an embodiment of the present invention. Through operation of the method, here a spreading code, is allocated for communications with a mobile station. The code allocation is made pursuant to a reuse scheme if the mobile station is determined likely to be stationary and is a uniquely-assigned code if the mobile station is determined likely to be moving at a speeding in excess of a selected threshold.

First, and as indicated by the block 74, the identification of the mobile station is recorded. The identity of the mobile station is recorded, for instance, when the mobile station is in the paging idle mode as well as the traffic mode. And, as indicated by the block 76, the zone 18 in which the mobile station is positioned and a flag associated therewith is set to a zero value. Such values are amongst the indicia stored at the mobile station moving behavior indicia database 42. The storage method by which to store the indicia is formed of, for instance, an information-theoretic framework. By building and maintaining a dictionary of the pack updates of the individual mobile station, or the user associated with the mobile station, location uncertainty and entropy algorithms can be utilized to learn the moving behavior of the mobile station and characteristic profiles of the mobile station. When an incoming or outgoing call is requested to be terminated or originated, at the mobile station, operation of the apparatus 26 faces the probability of the moving behavior of the mobile station to determine whether the mobile station is stationary during the time of the request and a subsequent window thereafter. The request for the traffic channel is indicated by the block 78.

A determination is made, as indicated by the decision block 82, as to whether the mobile station is stationary, based upon analysis of the moving behavior indicia. If the mobile station is determined to be stationary, the true, T, branch is taken to the block 84. Code reuse is utilized. Here, a look-up table is accessed to assign a reuse code.

FIG. 4 illustrates an exemplary look-up table, shown generally at 86 that is accessed to determine what code to be allocated to the stationary, or slowly moving, mobile station. The alphabetic identifiers used in FIGS. 1 and 2 are again utilized in the table. The zones A–J are listed in the column 88 of the table. And, the rows 92, indexed together with the zones in successive columns 94 identify biological value of 0 or 1 whether the code of that zone can be reused. If the mobile code can be used, the code is identified as 1 in the table. For instance, zone "A" can only select a reuse code from the zone set of [G, H, I, J]. If the mobile station is determined to be stationary, then the code reuse method is applied. However, when the mobile station has already applied the reuse code in the cell, and the base station controller experiences that the mobile station is leaving the dedicated zone or that the mobile station has started to move at a speed in excess of the selected threshold, the mobile station is switched to a new orthogonal code that is not being used in the cell and shall keep using the newly-assigned code to the end of the communication session. This type of situation is statistically rare as the network is able to maintain a good record of knowledge to predict the moving behavior of the mobile station. Also, if the mobile station is determined to be moving at a speeding in excess of the selected threshold, then the code reuse algorithm is not applied to the call, even if the mobile station becomes stationary during the communication session. In this manner, the burden of the core network to switch back and forth between a new code and a reuse code, is alleviated.

Referring back again to FIG. 3, pursuant to the code allocation, a determination is made at the decision block 102 whether the flag is set to a logical one value. If not, the F branch is taken to the decision block 104 and a determination is made as to whether the zone in which the mobile station is positioned has changed and the flag is set to a logical 1 value. If the zone has not changed, the F branch is taken to the decision block 106. At the decision block 106, a determination is made as to whether the call has ended. If the call has ended, the T branch is taken to the end block 108. If the call has not ended, the F branch is taken back to the decision block 102.

Also, if the determination made at the decision block 102 is that the flag is of a logical 1 value, the T branch is taken to the decision block 106. If the mobile station is determined not to be stationary at the decision block 82, the F branch is taken to the block 112 and the code selected to be allocated to the mobile station is not otherwise used in the cell 14. Also, the T branch from the decision block 104 extends to the block 112.

Figure 5:
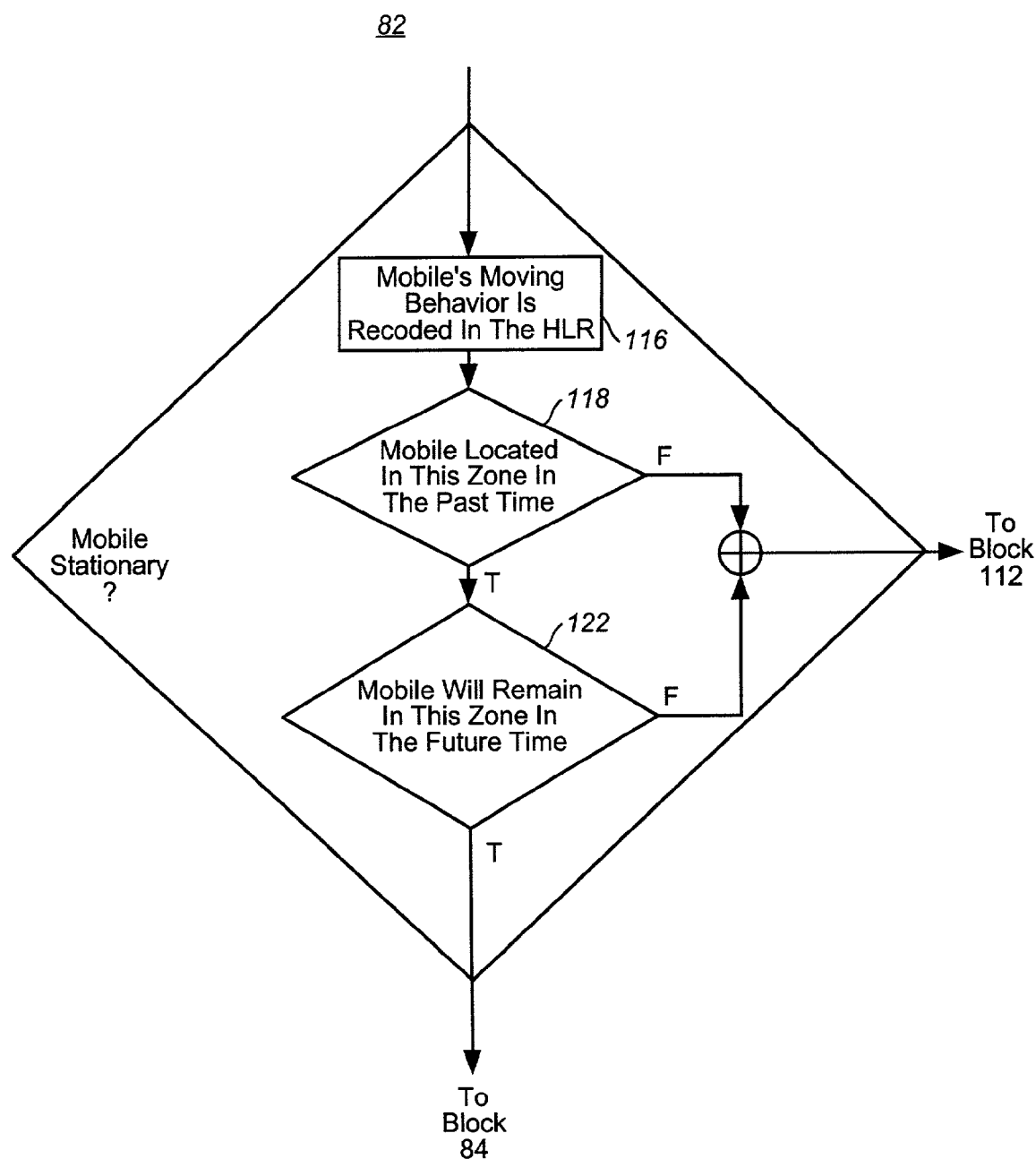
FIG. 5 illustrates another process diagram, also representative of operation of an embodiment of the present invention.

FIG. 5 illustrates, in greater detail, the operations performed at the decision block 82 in the determination by the apparatus 26 of whether the mobile station is stationary, i.e., moving at a speed less than a selected threshold. First, and as indicated by the block 116, the indicia associated with the moving behavior of the mobile station is stored at the database 42 (shown in FIG. 1) at the home location register of the mobile station.

Then, and as indicated by the decision block 118, a determination is made whether the mobile station has previously been located in the same zone in a previous time interval. If so, the T branch is taken to the decision block 122 and a determination is made whether the mobile station shall likely remain in the same zone in a succeeding time window. If so, the T branch is taken to the block 84 (shown in FIG. 3).

If, instead, at the decision block 118, a determination is made that the mobile station has not previously been located in the same zone, the F branch is taken to the block 112 (shown in FIG. 3). Also, if the determination made at the decision block 122 is that the mobile station shall not likely remain in the same zone for a selected time window, the F branch is also taken to the block 112.

As an example, if the mobile station is in the same zone for a several-minute period, or any other appropriate time period, a determination can be made that the mobile station is stationary at the determination time. After passing this first inquiry, the apparatus 26 then makes a subsequent inquiry to determine the possibility that the mobile station shall remain in the same zone for a succeeding time interval. Such determinations are made based on the values of the indicia stored at the database through analysis of the values of the indicia, the determiner 46 (shown in FIG. 1) determines the probability of the behavior of the mobile station in a succeeding time window. For instance, if the moving history of the mobile station indicates a 99% probability that the mobile station shall not be moving in a succeeding five-minute period, then a determination can be made that the mobile station shall likely be stationary during such succeeding 5-minute interval. If such a determination is made, a reused co-channel is assigned to the mobile station.

The relationship between a dedicated zone and possible code reuse zones can be pre-processed from field measurements or simulations. A look-up table, such as the table 86 shown in FIG. 4 can be built as code reuse sets in a cell. For example, again with respect to the table 86, if the mobile station is stationary in zone A and needs a traffic channel for communications pursuant to a communication session, the network shall select reused code from only the zone set equals [E, F, G, H, I, J]. The criteria is to find the least-commonly reused code in the zone set to minimize channel interference. If there is no reused code in the zone set, the stationary mobile station in the zone A shall select the reused code from the most-distance zone, i.e., select the reuse code from the zone G due to reduced channel interference levels.

And, referring back to FIG. 1, the base transceiver station 16 forms a master base station that has the capability to serve the entire coverage area of the cell 14. The zone set of a set equals [A, B, C, D, E, F, G, H, I, J] forms a subset of the transmission zones within the cell 14. The transceivers in all of the zones are synchronized with the main base transceiver station 16. The zone transceivers form dual-dipole antennas 22, (for micro-diversity), and are mounted, for instance, in an actual implementation, in any appropriate location, such as at the tops of street-light poles. These zone transceivers are located, for instance, close to boundary regions defining the cell. Directional antennas can also be utilized, if needed, further to reduce interference caused by transmissions in adjacent zones.

Exemplary transmission and receiving mechanisms are described. A mobile station 12 shown in FIG. 1 is positioned within the zone A region. If the mobile station initializes a call, a base station controller forming a part of the access network 28 of the communication system, uses a signal-strength selective method to examine the received signals from all of the zones and a base transceiver station 16. In this situation, zone A shall receive the strongest mean RSS (receiver signal strength) transmitted by the mobile station 12, greater than the signal strengths of signals received by other zones and the base transceiver station. Thus, the base station controller shall switch the transmitting antenna 22 to the zone A only.

The distance between the mobile station 12 and the zone antenna 22 of the zone A is relatively small, and the signal strength required of signals transmitted between forward and reverse-lengths are also relatively weak due to the short distance required of the transmissions. The transmission interference caused by such transmissions to other users in the same cell is reduced. And, interference from other users is also relatively reduced toward the same reason.

The communication system 10 includes a deployment of a master base transceiver station 16 and a subset of transceivers defining the zone antennas 22 at each zone 18, synchronized with the main base transceiver station transmissions. The synchronization is effectuated using, for instance, cable lines for wireless microwave point-to-point links. A power control mechanism is used at all the zones to maintain a receive signal quality. Orthogonal codes for the traffic channel are reused if the mobile stations are stationary and reused codes have no channel interference between one another. Thereby, improved communications in the communication system are possible.

The previous descriptions are of preferred examples for implementing the invention, and the scope of the invention should not necessarily be limited by this description. The scope of the present invention is defined by the following claims:

I claim:

1. Apparatus for selectably assigning a channel for communications between a first network station and a mobile station positioned within a cell defined by the first network station, the cell divided by the first network station into a first zone and at least a second zone, comprising:
   a position and movement determiner adapted to receive indicia associated with positioning and movement of the mobile station, the position and movement determiner configured to determine a position of the mobile station and a statistical indication of a speed, if any, at which the mobile station is moving; and
   a channel allocator adapted to receive an indication of a determination made by the position and movement determiner, the channel allocator configured to assign the channel for the communications between the first network station and the mobile station, channel assignation made by the channel allocator responsive, at least in part, to the position and the statistical indication of the speed of the mobile stations,
   wherein the position and movement determiner further determines whether the statistical indication of the speed at which the mobile station is moving is greater than a selected threshold, the channel assignation made by the channel allocator being responsive, in part, to the statistical indication of the speed of the mobile station comprises assignation made responsive to determinations made by the position and movement determiner of whether the statistical indication of the speed of the mobile station is greater than the selected threshold, and wherein the channel assignation made by the channel allocator is made for the at least one of the first zone and the second zone, the channel assignation being made pursuant to a channel reuse scheme when the statistical indication of the speed of the mobile station is determined to be less than the selected threshold.

2. The apparatus of claim 1, wherein the channel assignation made by the channel allocator is for a uniquely-assigned channel, throughout all zones of the cell, when the statistical indication of the speed of the mobile station is determined to be greater than the selected threshold.

3. The apparatus of claim 1, wherein the radio communication system operates pursuant to a code-division, multi-access (CDMA) scheme and wherein the channel assignation made by the channel allocator comprises a code assignation.

4. The apparatus of claim 1 further comprising an indicia database coupled to the position and movement determiner, the indicia database for maintaining a positioning and movement history of the mobile station and wherein the indicia to which the position and movement determiner is adapted to receive is originated at the indicia database.

5. The apparatus of claim 4 wherein the statistical indication of the speed at which the mobile station is moving is determined responsive to the movement history of the mobile station.

6. The apparatus of claim 4 wherein the radio communication system comprises a cellular communication system having a location register associated with the mobile station, and wherein the indicia database is embodied at the location register.

7. The apparatus of claim 1 wherein the statistical indication of the speed of the mobile station determined by the position and movement determiner comprises a probability that the mobile station is moving at a selected speed.

8. The apparatus of claim 1 wherein the first zone and the at least the second zone into which the cell is divided comprises a plurality of zones, a zone of the plurality at which the mobile station is positioned forming an active zone, zones positioned within a selected proximity to the active zone forming proximate zones, and the zones positioned beyond the selected proximity forming nonproximity zones and wherein the position determined by the position and movement determiner comprises an indication of the active zone at which the mobile station is positioned.

9. The apparatus of claim 8 wherein the channel assignation made by the channel allocator is selectably further responsive to which ones of the plurality of zones from the active and proximate zones, respectively, and which zones from nonproximate zones.

10. The apparatus of claim 9 wherein the channel assignation made by the channel assignor is made pursuant to a channel reuse scheme when the mobile station is determined to be moving at a speed less than a selected threshold, the channel assigned pursuant to the channel assignation selected pursuant to the channel reuse schedule from channels assigned for use at the nonproximate zones.

11. The apparatus of claim 10 wherein each zone of the plurality of zones is defined by a transmit/receive antenna, downlink transmission made at each transmit antenna, generated in synchronization, uplink transmission detected pursuant to a macro diversity scheme, and wherein determination made by the position and movement determiner are made responsive to macro diversity detections made at the transmit/receive antenna of the uplink transmissions.

12. A method for assigning a channel for communications between a first network station and mobile station positioned within a cell defined by the first network station, the cell divided into a first zone and at least a second zone, comprising:

determining positioning of, and a statistical indication of a speed, if any, at which the mobile station is moving; and selectably assigning the channel for the communications between the mobile station and the first network station responsive, at lest in part, to the position and statistical indication of the speed of the mobile station, wherein the operation of determining comprises determining whether the statistical indication of the speed indicates the mobile station to be moving at greater than a selected threshold, and wherein the channel selectably assigned during the operation of assigning is assigned pursuant to a channel reuse scheme when the mobile station is determined, during the operation of determining, to be moving at less than the selected threshold.

13. Apparatus for selectably assigning a channel for communications between a first network station and a mobile station positioned within a cell defined by the first network station, the cell divided by the first network station into a first zone and at least a second zone, comprising:

a position and movement determiner adapted to receive indicia associated with positioning and movement of the mobile station, the position and movement determiner configured to determine a position of the mobile station and a statistical indication of a speed, if any, at which the mobile station is moving; and a channel allocator adapted to receive an indication of a determination made by the position and movement determiner, the channel allocator configured to assign the channel for the communications between the first network station and the mobile station, channel assignation made by the channel allocator responsive, at least in part, to the position and the statistical indication of the speed of the mobile station, wherein the position and movement determiner further determines whether the statistical indication of the speed at which the mobile station is moving is greater than a selected threshold, the channel assignation made by the channel allocator being responsive, in part, to the statistical indication of the speed of the mobile station comprises assignation made responsive to determinations made by the position and movement determiner of whether the statistical indication of the speed of the mobile station is greater than the selected threshold, and wherein the channel assignment made by the channel allocator is for a uniquely-assigned channel, throughout all zones of the cell, when the statistical indication of the speed of the mobile station is determined to be greater than the selected threshold.

14. Apparatus for selectably assigning a channel for communications between a first network station and a mobile station positioned within a cell defined by the first network station, the cell divided by the first network station into a first zone and at least a second zone, comprising:

a position and movement determiner adapted to receive indicia associated with positioning and movement of the mobile station, the position and movement determiner configured to determine a position of the mobile station and a statistical indication of a speed, if any, at which the mobile station is moving;

a channel allocator adapted to receive an indication of a determination made by the position and movement determiner, the channel allocator configured to assign the channel for the communications between the first network station and the mobile station, channel assignation made by the channel allocator responsive, at least in part, to the position and the statistical indication of the speed of the mobile station;

an indicia database coupled to the position and movement determiner, the indicia database maintaining a positioning and movement history of the mobile station, wherein the indicia to which the position and movement determiner is adapted to receive is originated at the indicia database, and wherein the statistical indication of the speed at which the mobile station is moving is determined responsive to the movement history of the mobile station.

15. The apparatus of claim 14 wherein the position and movement determiner further determines whether the statistical indication of the speed at which the mobile station is moving is greater than a selected threshold.

16. The apparatus of claim 15 wherein the channel assignation made by the channel allocator is responsive, in part, to the statistical indication of the speed of the mobile station comprises assignation made responsive to determinations made by the position and movement determiner of whether the statistical indication of the speed of the mobile station is greater than the selected threshold.

17. The apparatus of claim 14 wherein the radio communication system comprises a cellular communication system having a location register associated with the mobile station, and wherein the indicia database is embodied at the location register.

18. Apparatus for selectably assigning a channel for communications between a first network station and a mobile station positioned within a cell defined by the first network station, the cell divided by the first network station into a first zone and at least a second zone, comprising:
   a position and movement determiner adapted to receive indicia associated with positioning and movement of the mobile station, the position and movement determiner configured to determine a position of the mobile station and a statistical indication of a speed, if any, at which the mobile station is moving; and
   a channel allocator adapted to receive an indication of a determination made by the position and movement determiner, the channel allocator configured to assign the channel for the communications between the first network station and the mobile station, channel assignation made by the channel allocator responsive, at least in part, to the position and the statistical indication of the speed of the mobile station,
   wherein the first zone and the at least the second zone into which the cell is divided comprises a plurality of zones, a zone of the plurality at which the mobile station is positioned forming an active zone, zones positioned within a selected proximity to the active zone forming proximate zones, and the zones positioned beyond the selected proximity forming nonproximity zones and wherein the position determined by the position and movement determiner comprises an indication of the active zone at which the mobile station is positioned.

19. The apparatus of claim 18 wherein the channel assignation made by the channel allocator is selectably further responsive to which ones of the plurality of zones from the active and proximate zones, respectively, and which zones from nonproximate zones.

20. The apparatus of claim 19 wherein the channel assignation made by the channel assignor is made pursuant to a channel reuse scheme when the mobile station is determined to be moving at a speed less than a selected threshold, the channel assigned pursuant to the channel assignation selected pursuant to the channel reuse schedule from channels assigned for use at the nonproximate zones.

21. The apparatus of claim 20, wherein each zone of the plurality of zones is defined by a transmit/receive antenna, downlink transmission made at each transmit antenna, generated in synchronization, uplink transmission detected pursuant to a macro diversity scheme, and wherein determination made by the position and movement determiner are made responsive to macro diversity detections made at the transmit/receive antenna of the uplink transmissions.

22. A method for assigning a channel for communications between a first network station and mobile station positioned within a cell defined by the first network station, the cell divided into a first zone and at least a second zone, the method comprising the operations of:
   determining positioning of, and a statistical indication of a speed, if any, at which the mobile station is moving; and
   selectably assigning the channel for the communications between the mobile station and the first network station responsive, at lest in part, to the position and statistical indication of the speed of the mobile station,
   wherein the operation of determining comprises determining whether the statistical indication of the speed indicates the mobile station to be moving at greater than a selected threshold, wherein the channel selectably assigned during the operation of assigning comprises a uniquely-assigned channel throughout the cell when the mobile station is determined, during the operation of determining, to be greater than the selected threshold.

23. A method for assigning a channel for communications between a first network station and mobile station positioned within a cell defined by the first network station, the cell divided into a first zone and at least a second zone, the method comprising the operations of:
   determining positioning of, and a statistical indication of a speed, if any, at which the mobile station is moving; and
   selectably assigning the channel for the communications between the mobile station and the first network station responsive, at lest in part, to the position and statistical indication of the speed of the mobile station,
   wherein the operation of determining comprises determining whether the statistical indication of the speed indicates the mobile station to be moving at greater than a selected threshold, and wherein determinations made during the operation of determining are made responsive to values maintained at a positioning and movement history database.

24. The method of claim 23, wherein the operation of determining further comprises determining whether the statistical indication of the speed indicates the mobile station to be moving at greater than a selected threshold.

25. The method of claim 24 wherein the channel selectably assigned during the operation of assigning comprises a uniquely-assigned channel throughout the cell when the mobile station is determined, during the operation of determining, to be greater than the selected threshold.

26. The method of claim 24 further comprising the preliminary operation of maintaining a positioning and movement history database and wherein determinations made during the operation of determining are made responsive to values maintained at the database.

27. The method of claim 26 wherein values maintained at the positioning and movement history database are provided thereto at selected intervals by the mobile station.

* * * * *